United States Patent [19]

Hegedus et al.

[11] 4,359,543
[45] Nov. 16, 1982

[54] WATER-DISPLACING PAINT

[75] Inventors: Charles R. Hegedus, Warrington; Kenneth G. Clark, Chalfont, both of Pa.

[73] Assignee: The United States of America as represented by the Secretary of the Navy, Washington, D.C.

[21] Appl. No.: 288,598

[22] Filed: Jul. 30, 1981

[51] Int. Cl.$^3$ .......................... C09D 3/64; C09D 3/82; C09D 5/08
[52] U.S. Cl. ...................... 523/177; 524/157; 524/166; 524/204; 524/588; 524/601; 524/903
[58] Field of Search ................ 260/22 S; 106/2, 13, 106/14.24, 14.29; 523/177; 524/157, 166, 204, 903, 588, 601

[56] References Cited

U.S. PATENT DOCUMENTS

| | | | |
|---|---|---|---|
| 3,137,583 | 6/1964 | Bryan et al. | 106/14.25 |
| 3,453,124 | 7/1969 | Wurstner | 106/14.26 |
| 3,681,122 | 8/1972 | Domicone et al. | 428/429 |
| 3,766,123 | 10/1973 | Burnie et al. | 260/32.4 |
| 3,770,633 | 11/1973 | Holley et al. | 252/28 |
| 4,130,431 | 12/1978 | Kogure | 106/14.33 |
| 4,150,192 | 4/1979 | Downey | 428/462 |
| 4,157,991 | 6/1979 | Pilla | 260/22 S |

*Primary Examiner*—Ronald W. Griffin
*Attorney, Agent, or Firm*—R. S. Sciascia; Henry Hansen; Armand M. Vozzo, Jr.

[57] ABSTRACT

A water-displacing paint is disclosed for coating metallic surfaces in humid environments to prevent corrosion. The paint comprises controlled proportions of a silicone alkyd resin to serve as a binder and physical barrier, solvents including ethyl acetate, aromatic mineral spirits and 1,1,1 trichlorotrifluorethane for ensuring water immiscibility, a petroleum sulfonate to inhibit corrosion and aid surface absorption, and an organotitanate of isopropyl tri-titanate to promote surface adhesion. Selected amounts of titanium dioxide and zinc molybdate are included as pigments in one effective example of the paint to provide it a white color. Alternate colors may be produced conventionally by adding standard tinting pigments in amounts sufficient to yield the desired color.

11 Claims, No Drawings

WATER-DISPLACING PAINT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to paints and more particularly to an improved pigmented coating having water-displacing qualities for use upon metallic surfaces in humid environments to prevent corrosion.

Corrosion of metallic surfaces, particularly those of vehicles, such as aircraft, ships and automobiles, is an important concern of manintenance personnel because of the adverse effect on structural integrity and operating performance caused by corrosive deterioration. As a result, corrosion control procedures are steadfastly and regularly performed as part of an overall preventive maintenance program on such vehicles. When such vehicles are located in marine environments and subjected to the salt spray and high humidity associated therewith, corrosion control becomes even more critical a task and one which is made extremely difficult by the environmental conditions. A salt-laden atmosphere is highly corrosive, requiring that immediate attention be provided to cracked or chipped paint by recoating or touching-up the exposed bare metal substrate. When touch-up of the exposed areas is effected, moisture on or near the substrate, if not treated for removal, will cause voids in the applied coating and inadequate adhesion between the coating and the substrate, ultimately leading to additional corrosion and further maintenance problems.

Of the numerous coating compositions that have been developed to prevent corrosion of metal substrates, some have featured water-displacing qualities that facilitate their effective use in humid environments. These existing water-displacing coating compositions which generally contain corrosion inhibitors have been relatively effective in depositing clear, flexible, non-tacky films that act as physical barriers to corrosive elements. However, such film coatings have generally afforded only temporary protection, typically a maximum period of about sixty days, requiring frequent reapplications to prevent corrosion from attacking the metal substrate. While pigmented compositions have demonstrated more permanent coatings of the underlying metal, they have heretofore not possessed the level of water-displacement necessary for effective use in moist, marine environments, due to an adverse effect which pigmentation has evidenced on the water-displacing qualities of existing coating compositions.

SUMMARY OF THE INVENTION

Accordingly, it is a general purpose and object of the present invention to provide an improved pigmented coating composition that effectively displaces water and moisture on a metal substrate upon application thereby leaving a relatively permanent and durable coating upon the substrate to ensure its long-term corrosion protection.

Another object of the present invention is to provide a corrosion preventive paint that can be applied to bare metal substrates in humid environments without need of priming, thereupon exhibiting excellent adhesion, flexibility, as well as heat and weather resistance.

Still another object of the present invention is to provide a water-displacing paint for protection of metal surfaces from corrosion that is safe and easy to use, and economical to manufacture.

Briefly, these and other objects of the present invention are accomplished by a water-displacing paint for coating metallic surfaces in humid environments to prevent corrosion. The paint comprises controlled proportions of a silicone alkyd resin to serve as a binder and physical barrier, solvents including ethyl acetate, aromatic mineral spirits and 1,1,1 trichlorotrifluorethane for ensuring water immiscibility, a petroleum sulfonate to inhibit corrosion and aid surface absorption, and an organo-titanate of isopropyl tri-titanate to promote surface adhesion. Selected amounts of titanium dioxide and zinc molybdate are included as pigments in one effective example of the paint to provide it a white color. Alternate colors may be produced conventionally by adding standard tinting pigments in amounts sufficient to yield the desired color.

Other objects, advantages and novel features of the present invention will become apparent from the following detailed description thereof.

DESCRIPTION OF THE PREFERRED EMBODIMENT

The present invention is a water-displacing corrosion preventive paint which, when applied to a metal substrate without a primer, air dries to deposit an adherent, flexible, and durable coating of a desired color. The paint has a low surface tension, typically, typically less than 30 dynes per centimeter, permitting it to spread completely and readily upon the substrate, and displaces water from the substrate upon application by adsorbing onto the metal and diffusing under water droplets. It should be noted that the paint is immiscible with water so that droplets cannot be entrapped in the coating after application.

The paint contains a significant portion of a silicone alkyd resin which serves as a binder for the paint composition and provides the paint coating with its important physical characteristics. The silicone alkyd resin provides a polymer film having good adhesion, high temperature strength and hardness, and excellent chemical as well as abrasion resistance. The silicone alkyd resin is characterized by a solids content of 50 weight percent, a minimum phthalic anhydride content of approximately 20 weight percent, and a minimum oil content, preferably linseed for its drying qualities, of about 25 weight percent. One such silicone alkyd resin suitable for inclusion in the paint according to the present invention is Varkyd 385-50E, manufactured by the McCloskey Varnish Company.

A relatively small portion of a low molecular weight petroleum sulfonate is included in the paint to serve as a corrosion inhibitor, providing chemical protection for the metal substrate, and as an adsorption agent. Small percentages of the petroleum sulfonate offer sufficient corrosion retardation and surface adsorption without adversely effecting the desirable physical properties provided by the silicone alkyd resin. The petroleum sulfonate employed in the present paint formulations, detailed hereinafter, is a sodium petroleum sulfonate having a molecular weight of about 400 to 500 and a typical specific gravity of 0.980 at 77° F. The sodium petroleum sulfonate has an acid number, in accordance with ASTM-D-974, typically in the range of 6–10, and a saponification number, in accordance with ASTM-D-94, of between 16–25. One suitable sodium petroleum sulfonate is ALOX 904, manufactured by the Alox Corporation. Other low molecular weight petroleum sulfonates commonly employed as corrosion inhibitors, particularly those of barium and ammonium, are as equally effective as the sodium petroleum sulfonate contained in the present paint formulations.

Controlled portions of ethyl acetate, aromatic mineral spirits, and 1, 1, 1 trichlorotrifluoroethane are included in the paint composition as solvents. Selected and combined on the basis of solvency, evaporation rate, and ability to displace water, the solvents promote water displacement, ensure water immiscibility, and control drying time of the paint coating. The ethyl acetate employed in the paint formulations is a commercially available organic compound, also known chemically as ethyl ester acetic acid. The aromatic mineral spirits, also known as aromatic hydrocarbon, is a standard petroleum distillate having a boiling range between 365° F. and 410° F., a minimum flash point of 145° F., and a specific gravity range of 0.89–0.90 at 60° F. One such aromatic mineral spirit suitable for inclusion in the paint is Solvent G, manufactured by the AMSCO Division of Union Oil Company of California. The 1, 1, 1 trichlorotrifluoroethane included as a solvent in the paint is a widely known and generally available fluorohydrocarbon, one suitable trichlorotrifluoroethane being Freon TF, manufactured by the DuPont Company.

An organo-titanate of the monoalkoxy type is included as a coupling agent in the paint in small percentages to promote surface adhesion of the paint coating. The titanate employed in the present formulations is isopropyl, tri (N ethylamino-ethylamino) titanate in a 4.5% (by mass) solution with isopropyl alcohol. One suitable such titanate is KR-44S, manufactured by Kenrich Petrochemicals, Inc.

Desired coloring of the paint is provided by the addition of standard tinting pigments in appropriate amounts. Selected portions of commercially available compounds of titanium dioxide and zinc molybdate are combined in the present paint formulations to impart a white color to the paint. One suitable titanium dioxide compound commercially available is R-960, manufactured by the DuPont Company. An effective zinc molybdate compound suitable as a white pigment is MOLY-WHITE 101, manufactured by Sherwin Williams Chemicals. It should be understood that alternate colors can be obtained by decreasing the portion of titanium dioxide in the white paint formulations and adding the appropriate tinting pigments to impart the desired color to the paint.

One effective formulation of the paint according to the present invention is set forth below on a weight percent basis.

TABLE I

| | |
|---|---|
| Silicone Alkyd Resin | 39.1% |
| Ethyl Acetate | 19.4% |
| Aromatic Mineral Spirits | 11.7% |
| 1,1,1 Trichlorotrifluoroethane | 7.7% |
| Sodium Petroleum Sulfonate | 2.1% |
| Titanium Dioxide | 11.5% |
| Zinc Molybdate | 6.4% |
| Isopropyl, Tri (N—ethylamino-ethylamino) Titanate (4.5% in isopropyl alcohol) | 2.1% |

A second effective formulation of the paint is also set forth below on a weight percent basis.

TABLE II

| | |
|---|---|
| Silicone Alkyd resin | 42.9% |
| Ethyl acetate | 16.6% |
| Aromatic mineral spirits | 12.9% |
| 1,1,1 trichlorotrifluoroethane | 8.6% |
| Sodium petroleum sulfonate | 2.4% |
| Titanium dioxide | 9.6% |
| Zinc Molybdate | 4.8% |
| Isopropyl, tri (N ethylamino-ethylamino) titanate (4.5% in isopropyl alcohol) | 2.2% |

The foregoing water-displacing paint formulations are prepared by mixing the silicone alkyd resin, ethyl acetate, aromatic mineral spirits, and 1, 1, 1 trichlorotrifluoroethane in sequence, agitating after each ingredient is added. The petroleum sulfonate and organo-titanate in solution are then added separately, mixing after each is added. The titanium dioxide and zinc molybdate are then added, and the resulting mixture milled until the paint has a fineness of grind of 7, in accordance with ASTM-D-1210. It should be noted that in the event of extended periods of storage of the paint, such as in excess of three to four months, an anti-settling agent may be added to the paint to facilitate dispersion of the pigments.

The paint can be applied by spray techniques and may be packaged in a pressurized spray container using dichlorodifluoromethane (Freon-12) as a propellant. Effective spray application of the paint is achieved by combining approximately 250 milliliters of the paint as formulated in Table I or II with approximately 115 milliliters of the propellant in a standard 16 ounce (473 ml) pressurized spray container.

Upon the metal substrate to be coated, it is recommended that the paint be applied to a dry film thickness of $33 \pm 5\mu$ ($1.3 \pm 0.2$ mils). Upon application, the organic solvents begin to evaporate into the atmosphere and the silicone alkyd polymer reacts with oxygen in the air causing oxidation and crosslinking to occur. Such reaction results in formation of a flexible, pigmented coating which is initially soft but which hardens in time, typically in about 8 hours, to produce a hard, durable finish for long-term corrosion protection of the metal substrate.

Therefore, it is now apparent that the disclosed paint provides an improved pigmented coating composition that effectively displaces water and moisture on a metal substrate upon application thereby leaving a relatively permanent and durable coating upon the substrate to ensure its long-term corrosion protection. In addition, the disclosed corrosion preventive paint can be applied to the metal substrate in humid environments without need of priming and thereupon form a flexible coating having excellent adhesion as well as heat and weather resistance. Furthermore, the disclosed water-displacing, corrosion preventive paint is safe and easy to use, and economical to manufacture.

Obviously, many modifications and variations of the present invention will readily come to those of ordinary skill in the art in light of the above teachings. It is therefore to be understood that, within the scope of the appended claims, the invention may be practiced otherwise than as specifically described.

What is claimed is:

1. A water-displacing paint for coating metallic surfaces to prevent corrosion, comprising:

a binder consisting essentially of a silicone alkyd resin having a solids content of about 50 weight percent, a minimum phthalic anhydride content of about 20 weight percent, and a minimum oil content of about 25 weight percent;

solvents including ethyl acetate, aromatic mineral spirits and 1,1,1 trichlorotrifluoroethane;

a corrosion inhibitor consisting essentially of a petroleum sulfonate having a low molecular weight sulfonate;

an adhesion promotor consisting essentially of an organo-titanate of the monalkoxy type, said organo-titanate being isopropyl, tri(N-ethylamino-ethylamino) titanate; and pigments in sufficient amounts to impart a desired color to the paint.

2. A water-displacing paint according to claim 1, wherein:

said petroleum sulfonate is selected from the group consisting of sodium petroleum sulfonate, barium petroleum sulfonate, and ammonium petroleum sulfonate.

3. A water-displacing paint according to claim 2 wherein said petroleum sulfonate is petroleum sodium sulfonate.

4. A water-displacing paint according to claim 1, wherein:

said pigments consist essentially of titanium dioxide and zinc molybdate to impart a white color to the paint.

5. A water-displacing paint according to claim 4, wherein:

said silicone alkyd resin constitutes about 39 to 43 weight percent of the paint;

said solvents constitute about 38 to 43 weight percent of the paint, said ethyl acetate being about 16 to 19 weight percent, said mineral spirits being about 11 to 13 weight percent, and said trichlorotrifluoroethane being about 8 weight percent of the paint;

said petroleum sulfonate constitutes about 2.0 to 2.5 weight percent of the paint;

said isopropyl, tri (n-ethylamino-ethylamino) titanate constitutes about 2 weight percent of the paint; and said pigments constitute about 14 to 18 weight percent of the paint, said titanium dioxide being about 9.5 to 11.5 weight percent, and said zinc molybdate being about 4.5 to 6.5 weight percent of the paint.

6. A water-displacing paint according to claim 1, further comprising:

a propellant consisting essentially of dichlorodifluoromethane for packaging the paint in a pressurized spray container.

7. A water-displacing paint for coating metallic surfaces to prevent corrosion, comprising:

about 40 weight percent of a binder consisting essentially of a silicone alkyd resin having a solids content of about 50 weight percent, a minimum phthalic anhydride content of about 20 weight percent, and a minimum oil content of about 25 weight percent;

about 40 weight percent of solvents including about 20 weight percent of ethyl acetate, about 12 weight percent of aromatic mineral spirits, and about 8 weight percent of 1,1,1 trichlorotrifluoroethane;

about 2.0 to 2.5 weight percent of a corrosion inhibitor consisting essentially of a petroleum sulfonate having a low molecular weight;

about 2 weight percent of an adhesion promotor consisting essentially of isopropyl, tri(N-ethylamino-ethylamino) titanate; and a sufficient amount of pigment material to impart a desired color to the paint.

8. A water-displacing paint according to claim 7, wherein: said pigment material includes titanium dioxide and zinc molybdate.

9. A water-displacing paint according to claim 7, wherein: said petroleum sulfonate is selected from the group consisting of sodium petroleum sulfonate, barium petroleum sulfonate, and ammonium petroleum sulfonate.

10. A water-displacing paint according to claim 9, wherein said petroleum sulfonate is sodium petroleum sulfonate.

11. A water-displacing paint according to claim 7, further comprising:

a propellant consisting essentially of dichlorodifluoromethane for packaging the paint in a pressurized spray container.

* * * * *